(12) United States Patent
Pomaranski et al.

(10) Patent No.: US 6,928,589 B1
(45) Date of Patent: Aug. 9, 2005

(54) NODE MANAGEMENT IN HIGH-AVAILABILITY CLUSTER

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/764,244

(22) Filed: Jan. 23, 2004

(51) Int. Cl.$^7$ ............................................. G06F 11/00
(52) U.S. Cl. ........................................ 714/47; 709/240
(58) Field of Search ................................ 714/47, 4, 16, 714/25, 37, 39, 43, 56, 15, 21; 709/220, 221, 709/224, 226, 239, 240

(56) References Cited

U.S. PATENT DOCUMENTS

| | | | |
|---|---|---|---|
| 5,390,326 A * | 2/1995 | Shah ........................... 370/222 |
| 5,898,827 A * | 4/1999 | Hornung et al. .............. 714/11 |
| 6,072,857 A * | 6/2000 | Venkateshwaran et al. .... 379/9 |
| 6,304,546 B1 * | 10/2001 | Natarajan et al. ........... 370/216 |
| 6,389,550 B1 * | 5/2002 | Carter ........................... 714/1 |
| 6,389,551 B1 | 5/2002 | Yount |
| 6,609,213 B1 * | 8/2003 | Nguyen et al. ................. 714/4 |
| 6,654,801 B2 * | 11/2003 | Mann et al. ................. 709/224 |
| 6,725,401 B1 * | 4/2004 | Lindhorst-Ko ............... 714/47 |
| 6,728,896 B1 * | 4/2004 | Forbes et al. .................. 714/4 |
| 2003/0158936 A1 * | 8/2003 | Knop et al. ................. 709/224 |
| 2004/0100971 A1 * | 5/2004 | Wray ......................... 370/400 |

* cited by examiner

*Primary Examiner*—Nadeem Iqbal (57) ABSTRACT

One embodiment disclosed relates to a method of status generation for a node of a high-availability cluster. A heartbeat signal is sent from the node through a network to the cluster. In addition, a current status of the node is determined, and the status is sent out through a specialized interface to a next node. Another embodiment disclosed relates to a method of cluster-wide management performed per node. A heartbeat input received from the previous node is checked. Furthermore, an up/down status input received from the previous node and a degraded status input received from the previous node are also checked. Another embodiment disclosed relates to a system for of a high-availability cluster. The system includes a general inter-node communication network that is configured to carry signals including heartbeat signals from the nodes. In addition, a separate inter-node communication channel is included for communicating node status signals.

12 Claims, 7 Drawing Sheets

Node Status Generation Process
300

FIG. 4 Cluster-Wide Management Process 400

FIG. 5A

Logical Analysis
414

FIG. 5B

Removal Procedure

NODE MANAGEMENT IN HIGH-AVAILABILITY CLUSTER

BACKGROUND OF THE INVENTION

1. Field of the Invention

The present disclosure relates generally to computer networks. More particularly, the present disclosure relates to clusters of interconnected computer systems.

2. Description of the Background Art

A high-availability (HA) cluster is a parallel or distributed system that comprises a collection of interconnected computer systems or servers that is used as a single, unified computing unit. Members of a cluster are referred to as nodes or systems. The cluster service is the collection of software on each node that manages cluster-related activity. The cluster service sees all resources as identical objects. Resource may include physical hardware devices, such as disk drives and network cards, or logical items, such as logical disk volumes, TCP/IP addresses, entire applications and databases, among other examples. A group is a collection of resources to be managed as a single unit. Generally, a group contains all of the components that are necessary for running a specific application and allowing a user to connect to the service provided by the application. Operations performed on a group typically affect all resources contained within that group. By coupling two or more servers together, clustering increases the system availability, performance, and capacity for network systems and applications.

Clustering may be used for parallel processing or parallel computing to simultaneously use two or more CPUs to execute an application or program. Clustering is a popular strategy for implementing parallel processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. If one server suffers an unexpected software or hardware failure, another clustered server may assume the operations of the failed server. Thus, if any hardware of software component in the system fails, the user might experience a performance penalty, but will not lose access to the service.

Current cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS supports the clustering of two NT servers to provide a single highly available server.

Clustering may also be implemented in computer networks utilizing storage area networks (SAN) and similar networking environments. SAN networks allow storage systems to be shared among multiple clusters and/or servers. The storage devices in a SAN may be structured, for example, in a RAID configuration.

In order to detect system failures, clustered nodes may use a heartbeat mechanism to monitor the health of each other. A heartbeat is a signal that is sent by one clustered node to another clustered node. Heartbeat signals are typically sent over an Ethernet or similar network, where the network is also utilized for other purposes.

Failure of a node is detected when an expected heartbeat signal is not received from the node. In the event of failure of a node, the clustering software may, for example, transfer the entire resource group of the failed node to another node. A client application affected by the failure may detect the failure in the session and reconnect in the same manner as the original connection.

If a heartbeat signal is received from a node of the cluster, then that node is normally defined to be in an "up" state. In the up state, the node is presumed to be operating properly. On the other hand, if the heartbeat signal is no longer received from a node, then that node is normally defined to be in a "down" state. In the down state, the node is presumed to have failed.

SUMMARY

One embodiment disclosed herein pertains to a method of status generation for a node of a high-availability cluster. A heartbeat signal is sent from the node through a network to the cluster. In addition, a current status of the node is determined, and the status is sent out through a specialized interface to a next node.

Another embodiment disclosed herein pertains to a method of cluster-wide management performed per node. A heartbeat input received from the previous node is checked. Furthermore, an up/down status input received from the previous node and a degraded status input received from the previous node are also checked.

Another embodiment disclosed herein pertains to a system for of a high-availability cluster. The system includes a general inter-node communication network that is configured to carry signals including heartbeat signals from the nodes. In addition, a separate inter-node communication channel is included for communicating node status signals.

DETAILED DESCRIPTION

Figure 1:
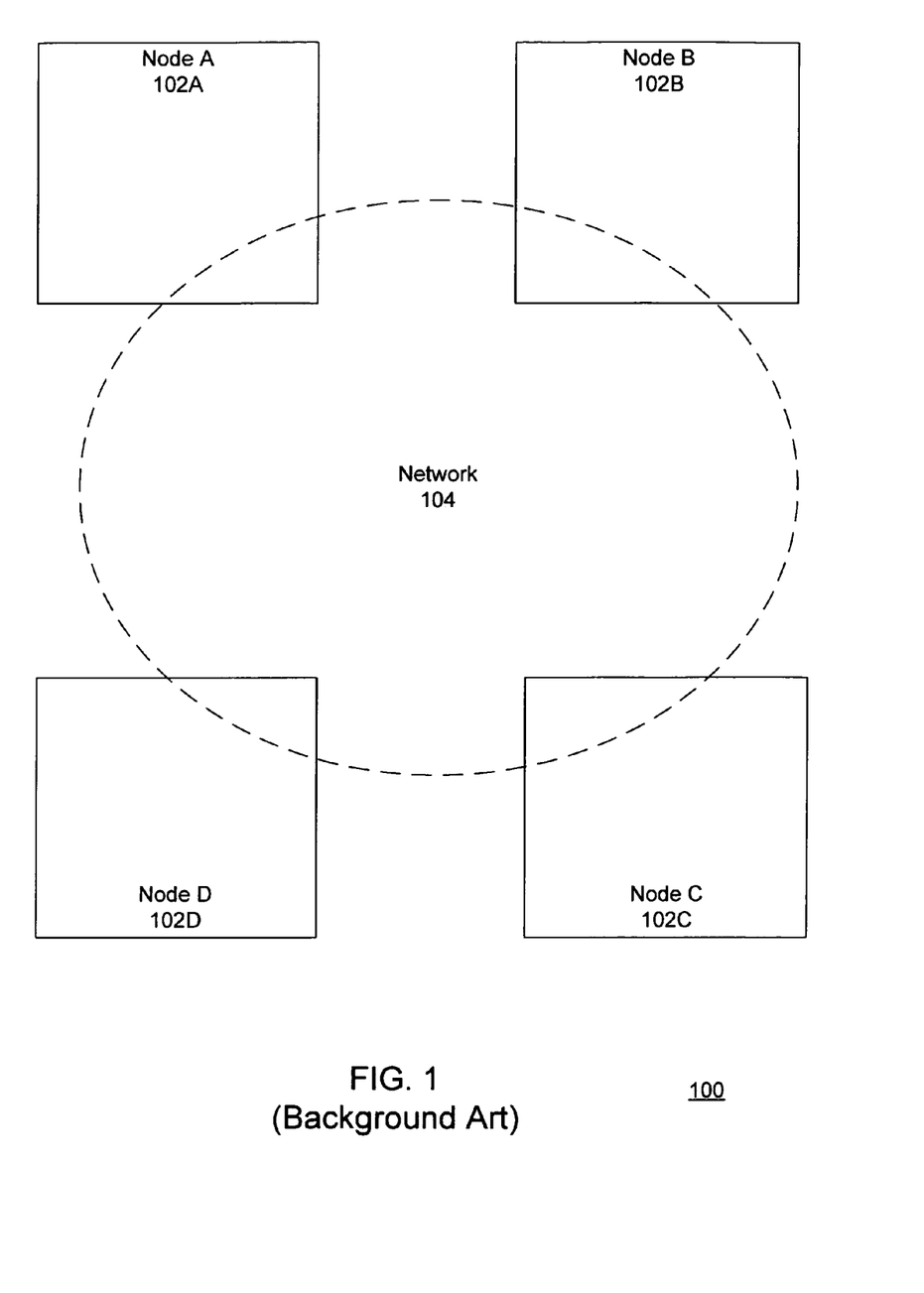
FIG. 1 is a schematic diagram depicting a conventional high-availability cluster.

FIG. 1 is a schematic diagram depicting a conventional high-availability cluster 100. As shown, the conventional cluster 100 includes multiple nodes 102 and a network or network mesh 104 (typically an Ethernet network) interconnecting the nodes. For example, heartbeat signals are sent from the nodes to the cluster over the network 104.

In the conventional cluster, all nodes provide a heartbeat signal through an Ethernet (or other networking) interface. All nodes in the cluster monitor these signals. If a node determines (or several nodes determine) that a node has stopped sending heartbeat signals, then that node is "removed" from the HA cluster.

However, there are several problems and disadvantages with this conventional approach. First, the communications path uses relatively slow and high-overhead connections between the nodes (Ethernet, for instance). Second, the conventional approach defines an "up" state in which the node is sending heartbeat signals to the cluster, and a "down" state in which the node fails to generate these heartbeat signals. This is disadvantageous in that a node can still send heartbeats even if a target critical application is "down." Third, a missed heartbeat signal is ambiguous in that it may be due to any number of causes (for instance, either node or interconnect failure). Fourth, there is no means for a node to send a predictive message to the remaining nodes in the cluster. Such a predictive message, for example, would allow for the HA cluster software to pro-actively remove a node before it fails, resulting in increased cluster uptime. The above problems and disadvantages result in inefficient cluster-level software and sub-optimum uptime.

It turns out that the efficiency (i.e. uptime) of an HA cluster is largely determined by the amount of time it takes for the cluster system to recognize that a node in the cluster is in a "down" state. A node is in a down state when it ceases in its ability to perform useful computing or storage functions for the HA cluster. Once it has been determined that a node is "down", the HA clustering software can perform the necessary tasks to keep the rest of the cluster running, with little interruption of user tasks. The efficiency can also be limited by the number of unnecessary switchovers in an HA cluster, as each switchover event 'costs' some cluster-level uptime. Finally, the 'split-brain' situation should be avoided for an HA cluster to perform correctly. 'Split brain' is the situation (known by those skilled in the art) that results when a node that is thought to be 'down' really is not 'down'. Such a situation can result in data loss and/or failure of an HA cluster. Accuracy in node state determination is key to assuring that 'split brain' does not occur in an HA cluster.

In HA clusters, the downtime may be represented by the following equation:

Downtime per year=(num_unplanned_yr)*(ave_unplanned_switchover_time)+
(num_planned_yr)*(ave_planned_switchover_time)+
(num_filed_switchovers_yr)*(fail_recovery_time)

with the following definitions num_unplanned_yr=the number of times a node in an HA cluster fails in a year ave_unplanned_switchover_time=the average time for the HA cluster to "recover" from an unplanned node failure (i.e., a system crash or operating system panic)

num_planned_yr=the number of times a node is removed in a planned downtime event in a year ave_planned_switchover_time=the average time for the HA cluster to "recover" from a planned node removal num_failed_switchovers_yr=the number of times a switchover try "fails" and the cluster or critical application crashes fail_recovery_time=the average time for the HA cluster to "recover" from a failed switchover Reducing the value of any of the above factors contributes to the uptime of an HA cluster. It turns out that all or most of the above factors are influenced by the cluster's ability to both accurately and rapidly determine the current state of any given node in the cluster and to deal with the current state with the appropriate actions.

The disclosure of the present application addresses some of the problems and disadvantages with the conventional approach. First, the number of "false" detections of node failures is reduced. This reduces num_unplanned_yr. Second, predictive means (degradation status signaling) is used to move some unplanned failures to planned switchovers. Moreover, since failed switchovers typically occur under unplanned (uncontrolled) circumstances, this also reduces the num_failed_switchovers_yr. Third, reducing the time to detect a node failure. This reduces the ave_unplanned_switchover_time. Finally, the very harmful 'split-brain' situation is avoided since the invention has built-in mechanisms for quicky and accurately double (or triple) checking node status when it looks like a node may be down.

Figure 2:
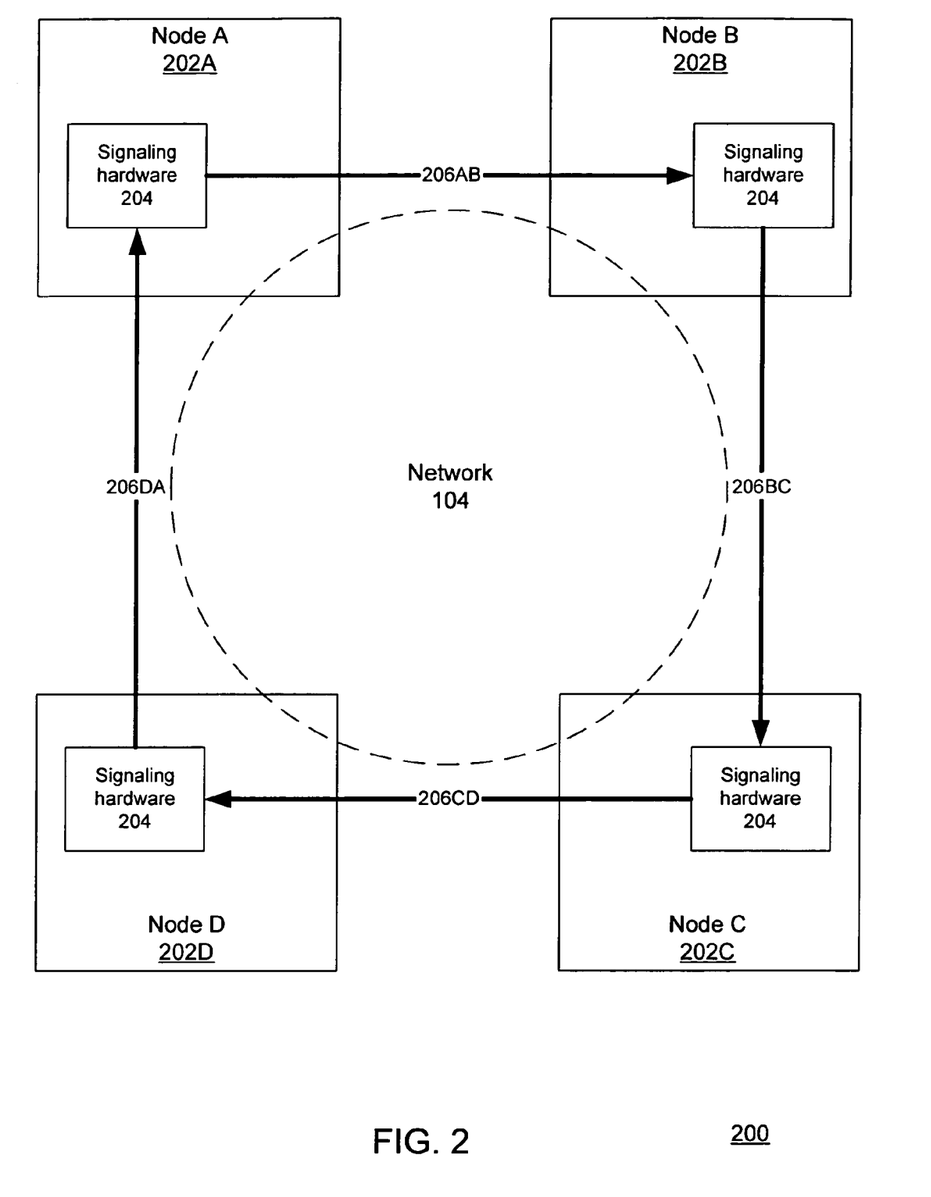
FIG. 2 is a schematic diagram depicting a representative high-availability cluster in accordance with an embodiment of the invention.

FIG. 2 is a schematic diagram depicting a representative high-availability cluster 200 in accordance with an embodiment of the invention. Four nodes 202 are shown in the diagram, but various numbers of nodes may be used within the scope of the invention.

In addition to inter-node communications via the network 104, independent inter-node communications of status information are enabled by way of a separate communication channel. As shown, the separate communication channel may, for example, utilize additional signaling hardware circuitry 204 in each node to provide point-to-point links 206 in an exemplary ring topology. In the ring topology, each node 202 may send status information over a communication link 206 to the next node 202 in the ring (going clockwise in the illustrated example) and may receive status information over another link 206 from the previous node 202 in the ring. Advantageously, such a configuration having an additional channel for status communications allows for rapid and reliable exchange of node status data.

In one embodiment, cluster-level software runs on each node 202. Each node 202 may be configured to provide the following resources to the cluster-level software. Hardware resources include a processor or processors, a memory system, disk-based or similar data storage, an interface to the network 104 interconnecting the nodes, and the dedicated signaling hardware 204 for inter-node status signaling. Software resources includes routines to perform the following tasks: updating and transmitting the status of the present node 202; monitoring and analyzing status data from another node 202 in the cluster; and taking appropriate action based on the status data from the node 202 being monitored. The computational subsystem of the node may, or may not, be running a mission-critical software application. If it is, then the mission-critical application is listed in a configuration file of the cluster-level software.

In one embodiment, the node status signals may include the following: an up/down status signal; a degraded status signal, and a heartbeat signal. The heartbeat signal may be transmitted conventionally via the network 104 so that the heartbeat information of all nodes in the HA cluster is on the network 104. The up/down and degraded status signals may be transmitted and received separately via the additional signaling hardware 204 and independent communication links 206. For the up/down status signal, up (or GOOD) indicates that the node is operating, and down (or BAD) indicates that the node has failed. The degraded status signal may comprise a two-state signal having DEGRADED and NOT_DEGRADED states. Alternatively, the degraded status signal may include multiple degradation levels.

Figure 3:
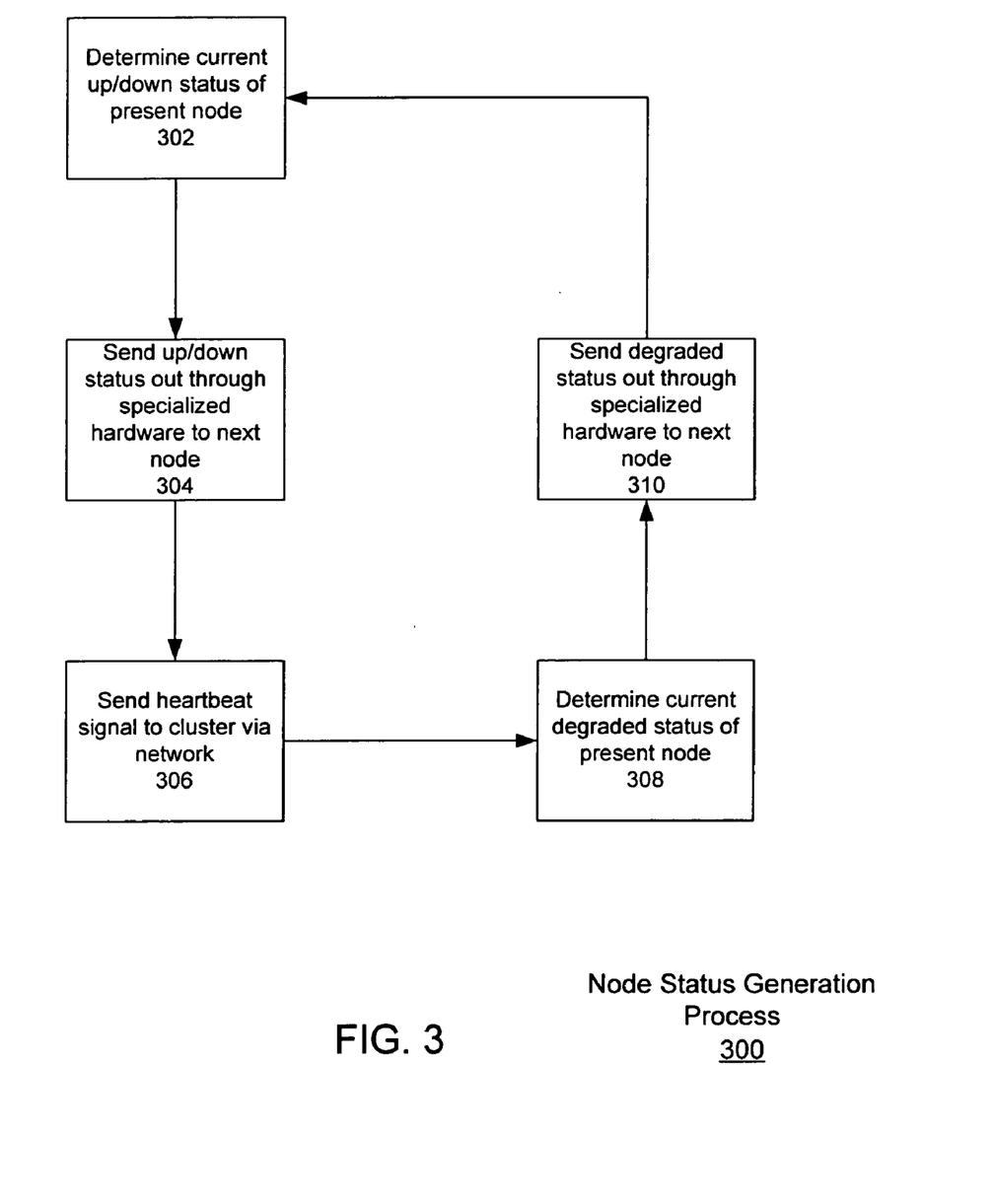
FIG. 3 is a flow chart depicting a node status generation process in accordance with an embodiment of the invention.

FIG. 3 is a flow chart depicting a node status generation process 300 in accordance with an embodiment of the invention. This process 300 occurs at each active node of the cluster.

Each active node determines 302 its current up/down status. This determination may be accomplished by applying rules in a rule file stored in memory or on disk at the present node. An up (or GOOD) status indicates that the node is operating, and a down (or BAD) status indicates that the present node has failed. The up/down status data is then sent out 304 from the present node through the specialized hardware interface 204 to the next node in the cluster. For example, in the case of the topology of FIG. 2, node A 202A would send its up/down status data to node B 202B, node B 202B would send its up/down status data to node C 202C, node C 202C would send its up/down status data to node D 202D, and node D 202D would send its up/down status data to node A 202A.

Each node also sends 306 its heartbeat signal to the cluster. This is conventionally done via the network 104.

Furthermore, each active node determines 308 its current degraded status (or level). This determination may be accomplished by applying rules in a rule file stored in memory or on disk at the present node. For example, the degraded levels may be indicated by a multiple bit signal wherein all zeroes may indicate a failed (down or BAD) node, all ones may indicate that no degradation was detected, and non-zero values (some zeroes and some ones) may indicate a level of degradation between failure and no degradation. The degraded status data is then sent out 310 from the present node through the specialized hardware interface 204 to the next node in the cluster. For example, in the case of the topology of FIG. 2, node A 202A would send its degraded status data to node B 202B, node B 202B would send its degraded status data to node C 202C, node C 202C would send its degraded status data to node D 202D, and node D 202D would send its degraded status data to node A 202A.

The process 300 then loops from the last step 310 to the first step 302. Note that, although an exemplary order for the steps in the process 300 is shown, variations of the order are possible with same or similar result.

Figure 4:
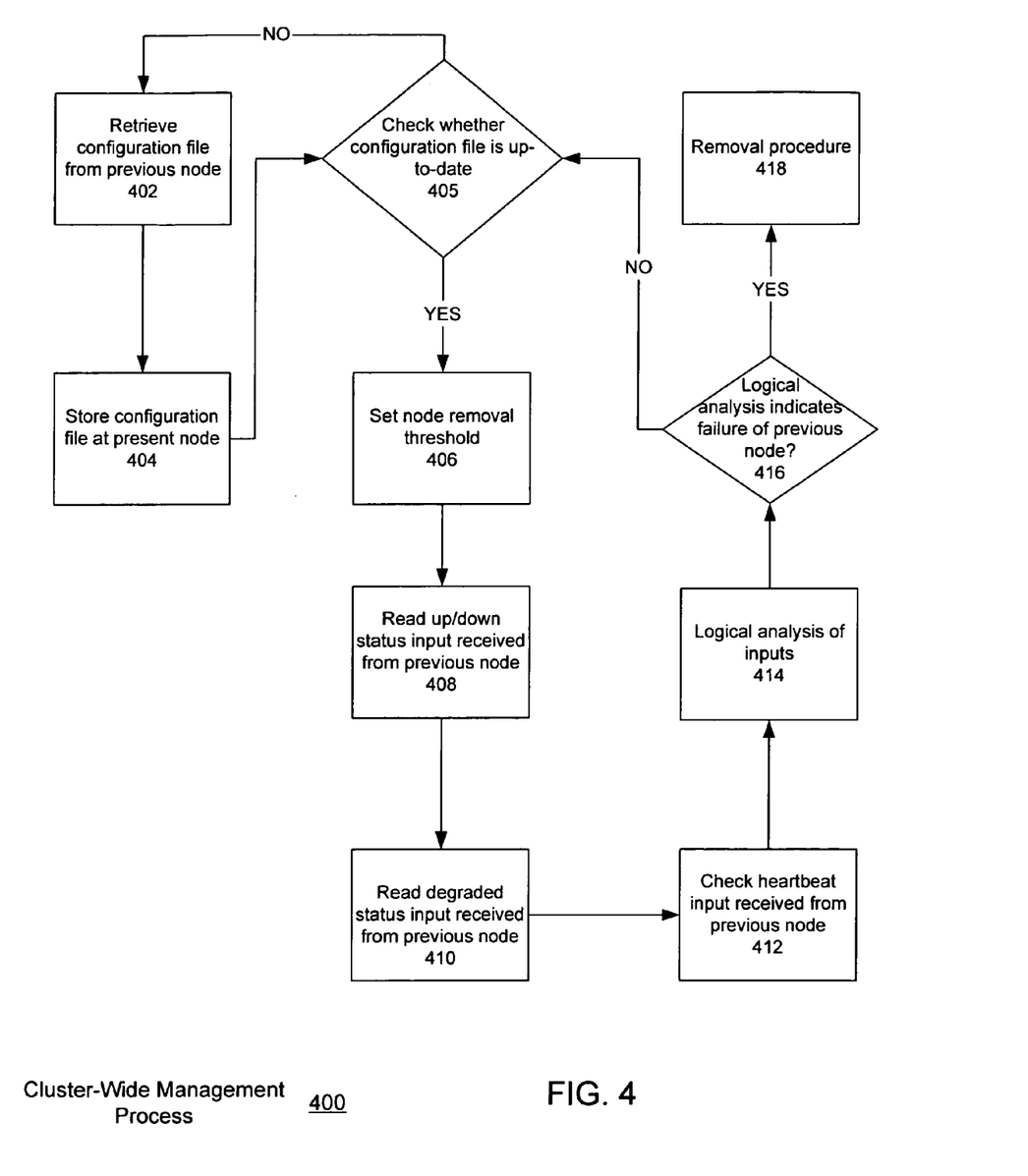
FIG. 4 is a flow chart depicting a cluster-wide management process in accordance with an embodiment of the invention.

FIG. 4 is a flow chart depicting a cluster-wide management process 400 in accordance with an embodiment of the invention. The process 400 involves steps performed at a present node and relates to the management of a previous node in the cluster. For example, node B 202 B would perform steps relating to the management of node A 202 A, node C 202 C would perform steps relating to the management of node B 202 B, and so on.

The process 400 is setup by retrieving 402 a configuration file for a previous node from that previous node, and storing 404 that configuration file at the present node. The configuration file includes various information, such as the application(s) needing to be failed over from the previous node in the event that the node is removed from the cluster.

Subsequent to the setup steps, the following steps are performed. The present node checks 405 whether the configuration file for the previous node is up-to-date (i.e. has not been updated since it was last retrieved). If it is not up-to-date, then the process 400 loops back to the step where the file is retrieved 402. If it is up-to-date, then the process 400 goes on to the following steps.

One of the steps involves setting 406 the node removal threshold. The node removal threshold may be determined from a ruleset of the cluster system. This threshold indicates to the system at which level of degradation will a node be proactively removed from the HA cluster. The threshold may be set or varied by the user. The threshold may also vary depending on how many nodes have been already removed from the HA cluster.

Other steps relate to reading or checking various inputs received from the preceding node. The present node reads 408 the up/down status input received from the previous node. The present node also reads 410 the degraded status input received from the previous node. Both the up/down status signal and the degraded status signal may be received via a dedicated communication link or cable 206 between the nodes. Furthermore, the present node also checks 412 the heartbeat input received from the previous node. The heartbeat signal may be received by way of a conventional network 104 interconnecting the nodes.

The present node performs a logical analysis 414 using these status-related inputs. The logical analysis 414 determines, for example, whether the inputs indicate that the preceding node is up, whether they indicate that the preceding node is down (failed), and whether they indicate that there is an interconnect problem. One embodiment for the analysis procedure 414 is described below in relation to FIGS. 5A and 5B.

After exiting from the analysis procedure 414, a determination 418 is made as to whether removal of the preceding node was indicated by the analysis. If the preceding node is to be removed, then a removal procedure 420 is run. One embodiment for the removal procedure 420 is described below in relation to FIG. 6. Otherwise the management process 400 loops back to the step where a check 405 is made as to whether the configuration file for the preceding node has been updated.

Figure 5A:
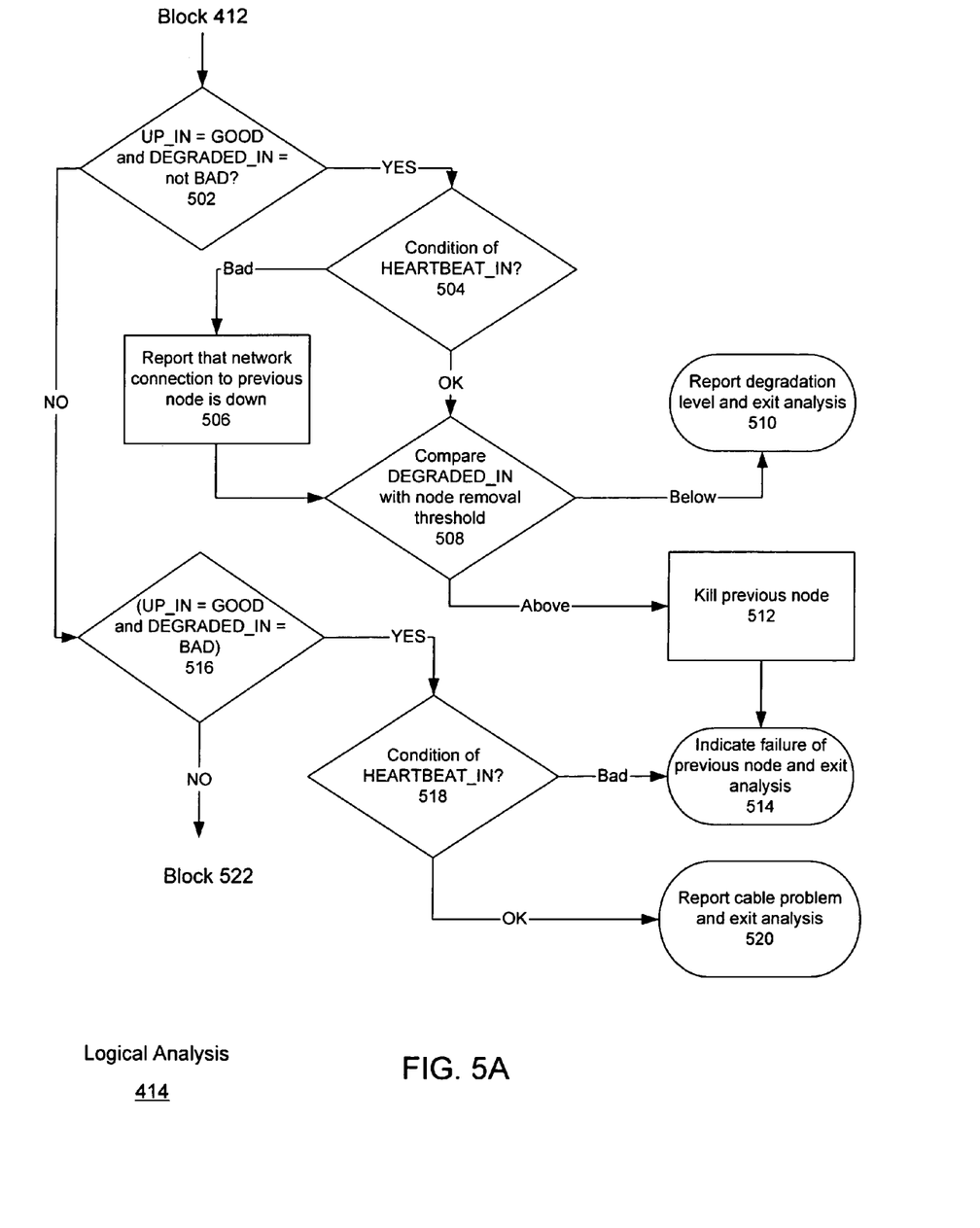
FIGS. 5A and 5B are flow charts depicting a logical analysis procedure in accordance with an embodiment of the invention.
Figure 5B:
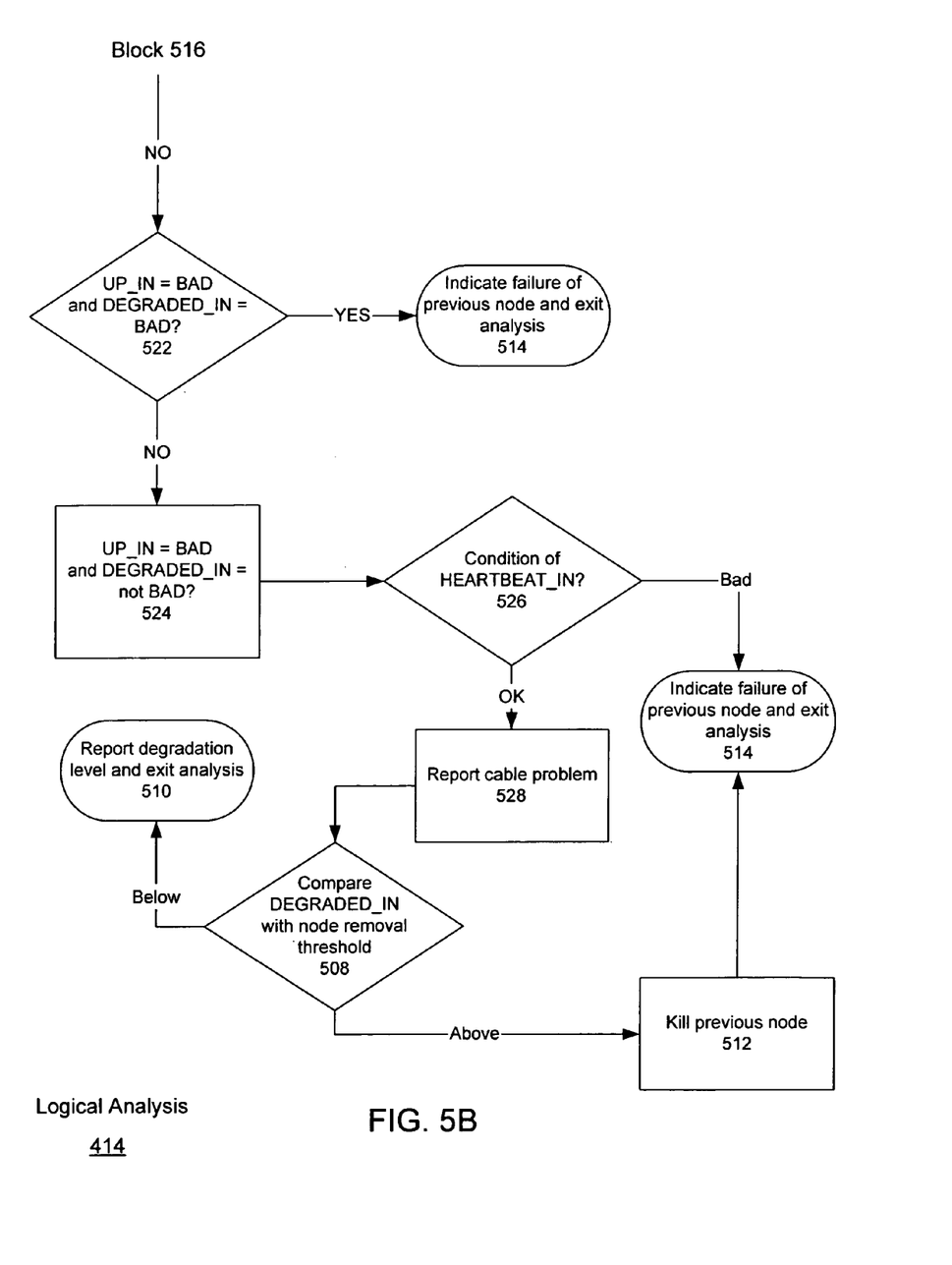

FIGS. 5A and 5B are flow charts depicting a logical analysis procedure 414 in accordance with an embodiment of the invention. In the figure, the up/down status input from the previous node is denoted as UP_IN, the degraded status input from the previous node is denoted as DEGRADED_IN, and the heartbeat input from the previous node is denoted as HEARTBEAT_IN. UP_IN can be in two states, GOOD or BAD. DEGRADED_IN can be in multiple degradation levels, including a BAD state, a GOOD state, and levels in between BAD and GOOD. The HEARTBEAT_IN can be either OK or Bad.

In a first case, a determination 502 is made that UP_IN=GOOD and DEGRADED_IN=not BAD (either GOOD or a level in between). If so, then the previous node is determined to be up (though perhaps degraded). The condition of HEARTBEAT_IN is then checked 504. If HEARTBEAT_IN=Bad, then the analysis 414 determines that the network connection that normally carries the heartbeat signal is down and reports 506 that the network to the previous node is down. If HEARTBEAT_IN=OK, then no such report is made. In either case, the level of DEGRADED_IN is compared 508 with the node removal threshold. If the amount of degradation is below the removal threshold, then the performance level of the previous node is acceptable. In that case, the degradation level is reported and the analysis procedure is exited 510. If the amount of degradation is above the removal threshold, then the performance of the previous node is deemed too poor to keep in the cluster. In that case, the previous node is "killed" 512, then failure of the previous node is indicated and the analysis procedure is exited 514.

In a second case, a determination 516 is made that UP_IN= GOOD and DEGRADED_IN=BAD. The condition of HEARTBEAT_IN is then checked 518. If HEARTBEAT_IN=Bad, then failure of the previous node is indicated (due to two of three inputs showing a down node) and the analysis procedure is exited 514. If HEARTBEAT_IN=OK, then the previous node is deemed to be running okay. In that case, a cable problem is reported (due to the non-matching degraded input) and the analysis procedure exits 520.

In a third case, a determination 522 is made that UP_IN=BAD and DEGRADED_IN=BAD. Here, both of these status inputs indicate that the previous node is down, so it does not matter what the heartbeat input indicates. In this case, failure is indicated and the analysis procedure exits 520.

In a fourth case, a determination 524 is made (by default since it's the last case) that UP_IN=BAD and DEGRADED_IN=not BAD. The condition of HEARTBEAT_IN is then checked 526. If HEARTBEAT_IN=Bad, then failure of the previous node is indicated (due to two of three inputs showing a down node) and the analysis procedure is exited 514. If HEARTBEAT_IN=OK, then the previous node is deemed to be running okay. In that case, a cable problem is reported 528 (due to the non-matching up/down input), and the level of DEGRADED_IN is compared 508 with the node removal threshold. If the amount of degradation is below the removal threshold, then the performance level of the previous node is acceptable. In that case, the degradation level is reported and the analysis procedure is exited 510. If the amount of degradation is above the removal threshold, then the performance of the previous node is deemed too poor to keep in the cluster. In that case, the previous node is "killed" 512, then failure of the previous node is indicated and the analysis procedure is exited 514.

Figure 6:
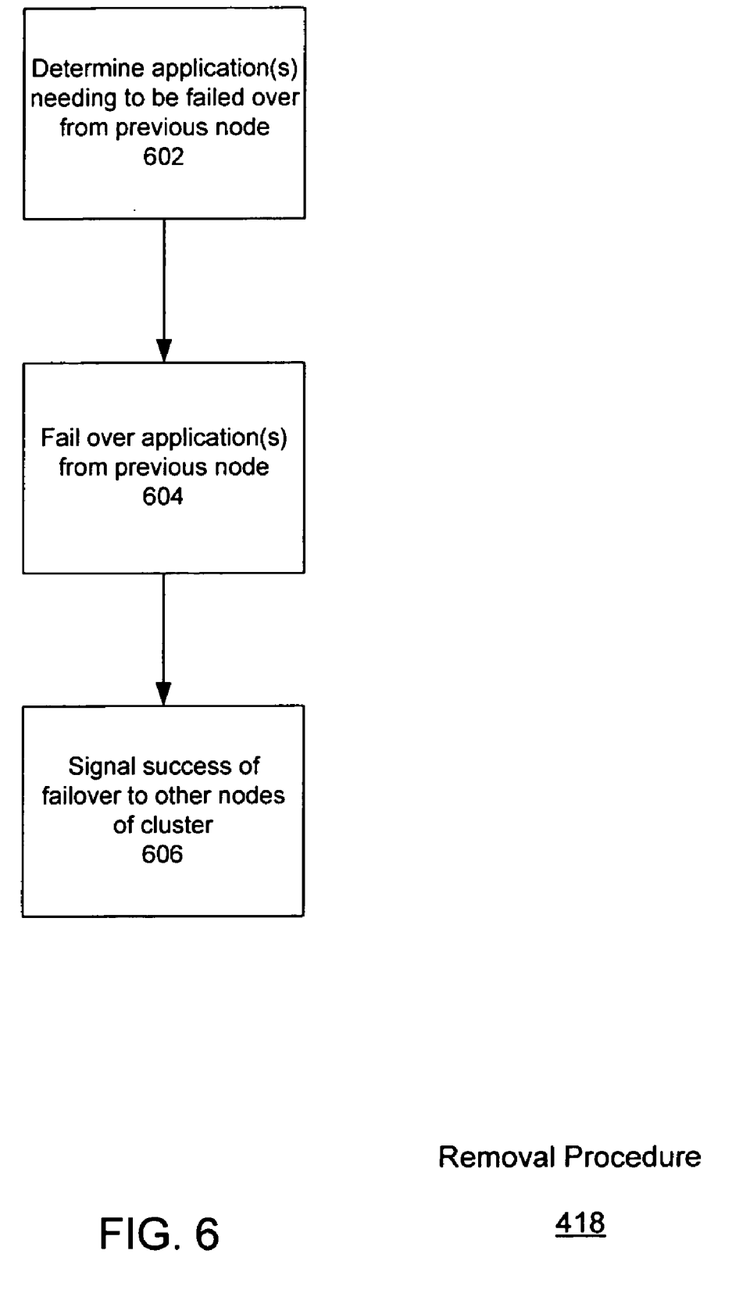
FIG. 6 is a flow chart depicting a removal procedure in accordance with an embodiment of the invention.

FIG. 6 is a flow chart depicting a removal procedure 418 in accordance with an embodiment of the invention. The removal procedure 418 is entered when the analysis 414 indicated failure of the previous node.

A determination 602 is made as to the application or applications on the previous node that need to be failed over. This information may be obtained, for example, from the above-discussed configuration file stored 404 at the present node. Fail over 604 is performed on these applications from the previous node to nodes of the cluster that are up and running. After the fail over is completed, success of the failover is signaled 606 to the other nodes of the cluster. The HA cluster is then running with the previous node removed.

When a node is getting added (or re-added) to the HA cluster, a node join (or re-join) procedure may be applied. The procedure is as follows. If the cables for independent status communications are not connected, then those status communications are temporarily suspended throughout the HA cluster. In other words, the HA cluster falls back to a heartbeat only mode. Next, the cables are connected to the new node. Then, the status communications via the cables are restarted in the cluster. When the node to join or re-join boots, it will start sending out GOOD signals through its specialized cable connection. At that point, the next node's cluster software will re-integrate the newly added node into the HA cluster.

The above disclosure provides a novel technique for a node in a high availability cluster to quickly and accurately determine each node's current state and to perform the appropriate action to maximize cluster uptime. The use of the three status indicators (up/down, degraded, and heartbeat) from each node allows for significant improvement in the efficiency (i.e. uptime) of the HA cluster.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of cluster-wide management performed per node, the method comprising:
   checking an up/down status input received from a previous node;
   checking a degraded status input received from the previous node, wherein the degraded status input comprises multiple degradation levels with one such level comprising a "bad" state indicating that the previous node appears down;
   checking a heartbeat input received from the previous node; and
   comparing the degraded status with a node removal threshold for potential removal of the previous node from the cluster if the degraded status shows degradation above the threshold.

2. The method of claim 1, further comprising:
   determining whether a configuration file at the previous node has been changed; and
   if the configuration file has been changed, then retrieving the configuration file from the previous node and storing the retrieved configuration file at the present node.

3. The method of claim 1, further comprising:
   performing a logical analysis of the inputs to determine whether a failure of the previous node is indicated.

4. The method of claim 3, wherein the logical analysis comprises determining a failure of the previous node if a majority of the status inputs indicates that the previous node appears down.

5. The method of claim 3, wherein the logical analysis differentiates between the failure of the previous node and a failure of an inter-node communication channel.

6. The method of claim 5, wherein the logical analysis further differentiates between a problem with a first inter-node communication channel and a problem with a second inter-node communication channel.

7. The method of claim 6, wherein the first inter-node communication channel comprises a point-to-point link dedicated for node status information, and wherein the second inter-node communication channel comprises a network for carrying heartbeat signals and other communications.

8. The method of claim 1, further comprising reporting that a network carrying the heartbeat is down if the heartbeat is bad and the two status inputs are not both bad.

9. The method of claim 1, further comprising reporting a problem with an inter-node communication channel carrying the status inputs if the heartbeat is okay and one, but not both, of the two status inputs is bad.

10. A system for of a high-availability cluster, the system comprising:

a general inter-node communication network that is configured to carry signals including heartbeat signals from the nodes; and a separate inter-node communication channel for communicating node status signals including at least an up/down status signal and a degraded status signal;

wherein the degraded status signal is compared with a node removal threshold for potential removal of a node from the cluster if the degraded status signal shows degradation above the threshold.

11. The system of claim 10, wherein the system is configured with a logical analysis procedure that differentiate between a failure of a node and a problem with inter-node communication.

12. The system of claim 11, wherein the logical analysis further differentiates between a problem with the general inter-node communication network and a problem with the separate inter-node communication channel.

* * * * *